(No Model.)
G. DAKIN & H. L. DRULLARD.
TEA KETTLE.
No. 399,843. Patented Mar. 19, 1889.
Fig. 1.
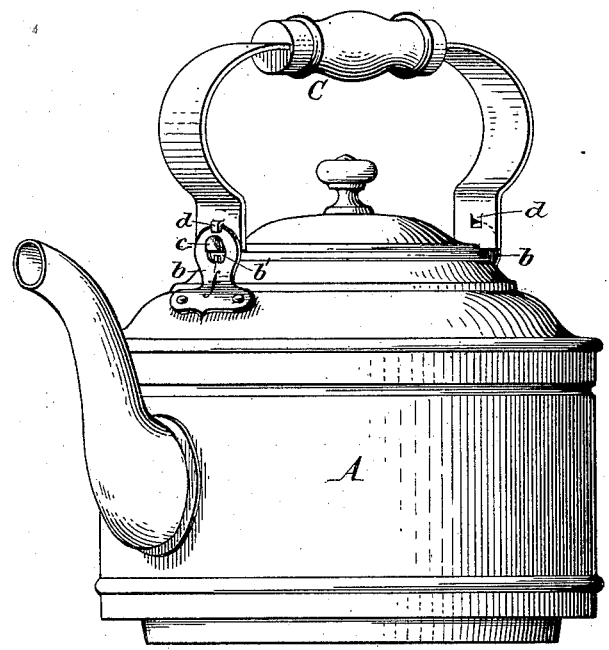
Fig. 2.
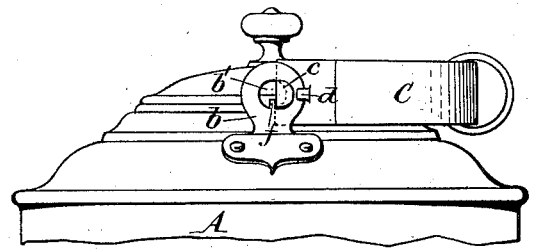
Fig. 3.
Fig. 4.
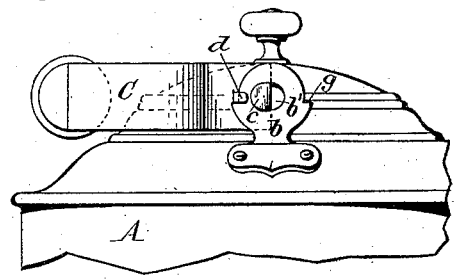
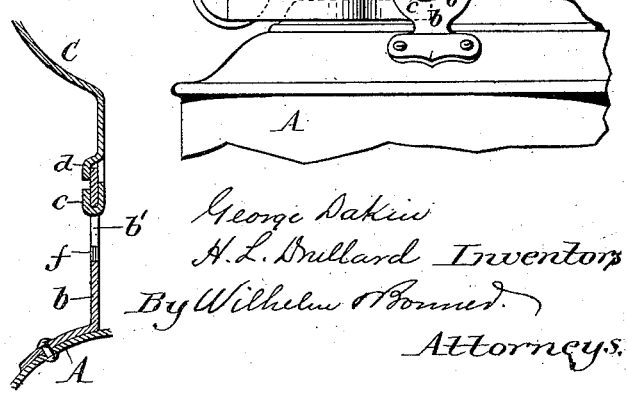
Witnesses:
Theo. L. Popp
Geo. J. Buchheit Jr.
George Dakin
H. L. Drullard Inventors
By Wilhelm Bonner
Attorneys.

UNITED STATES PATENT OFFICE.

GEORGE DAKIN AND HARRY L. DRULLARD, OF BUFFALO, NEW YORK.

TEA-KETTLE.

SPECIFICATION forming part of Letters Patent No. 399,843, dated March 19, 1889.

Application filed November 15, 1888. Serial No. 290,899. (No model.)

*To all whom it may concern:*

Be it known that we, GEORGE DAKIN and HARRY L. DRULLARD, both of the city of Buffalo, in the county of Erie and State of New York, have invented a new and useful Improvement in Tea-Kettles, of which the following is a specification.

This invention relates to an improvement in tea-kettles and other vessels having a pivoted or swinging bail or handle.

The invention has for its object to provide a simple and durable fastening for the bail which shall dispense with the use of rivets, and also to provide means whereby the bail is held from coming in contact with the body of the vessel, thus preventing overheating of the handle and indenting or marring of the vessel.

Our invention consists to these ends of the improvements which will be hereinafter fully described, and pointed out in the claims.

In the accompanying drawings, Figure 1 is a side elevation of a tea-kettle provided with our improvements. Fig. 2 is a similar view of the upper portion of the kettle. Fig. 3 is a vertical cross-section, on an enlarged scale, taken through one of the ears and the adjacent portion of the bail. Fig. 4 is a side elevation of the upper portion of a kettle, showing a modified construction of our improvement.

Like letters of reference refer to like parts in the several figures.

A represents the body of a tea-kettle, and $b$ $b$ are the ears secured to opposite portions of the top or crown of the kettle and provided with circular openings or perforations $b'$.

C represents the bail or handle, which is pivoted to the ears $b$ by means of hooks $c$, formed at opposite ends of the bail C and engaging in the openings $b'$ of the ears.

$d$ represents a lip arranged on the outer side of each end portion of the bail above the hooks $c$ and overlapping the upper edge of the ear $b$. The upper edge or top of each ear is curved concentric with the opening $b'$, so that the lips $d$ bear against the top of the ears as the bail is swung to either side. These lips snugly hold the hooks $c$ in the perforations of the ears $b$ $b$ and prevent any excessive play of the hooks in said perforations when the hooks become worn.

The bail is formed with the hooks $c$ and lips $d$, which are stamped out of the bail by suitable dies. The hooks $c$ and lips $d$, when formed, are arranged at an angle to the bail to permit the ready insertion of the ends of the hooks through the perforations of the ears $b$. After the hooks have been inserted through the perforations of the ears $b$, the hooks and lips are bent inwardly, as shown in the drawings, whereby the bail is firmly secured in the openings of the ears. This construction forms a durable and reliable fastening, which is comparatively inexpensive, as no rivets are employed. Each ear $b$ is provided within its opening $b'$ with a stop or projection, $f$, which is arranged in the lower portion of the opening $b'$ of the ear below the hook. As the bail or handle is tilted to either side, the bottom or lower side of the hooks comes in contact with the stops $f$ and arrests the further downward movement of the bail, whereby the latter is prevented from coming in contact with the body of the vessel.

Instead of forming the stops $f$ in the openings $b'$ of the ears, the stops may be formed on opposite sides of the ears, as shown at $g$ $g$ in Fig. 4, so that the lips $d$ will engage against the stops and limit the downward movement of the bail; or, if desired, both stops may be used in large vessels, so that the lower end of the hooks $c$ and the lips $d$ will both engage against the stops to limit the tilting movement of the bail. By arresting the downward movement of the bail before the latter comes in contact with the body of the kettle or vessel the latter is prevented from being marred or indented by reason of the bail striking the vessel, and the overheating of the handle is also avoided by reason of the latter resting against the kettle or vessel. The stops are readily stamped in one operation with the ears without materially increasing their cost.

We claim as our invention—

1. The combination, with the ears $b$, provided with openings $b'$, of a bail or handle provided at its ends with hooks $c$, engaging in the openings $b'$, and lips $d$, formed on the bail and bearing against the upper edges of the ears, whereby the hooks of the bail are held in the openings of the ears, substantially as set forth.

2. The combination, with the ears $b$, provided with openings $b'$, of a bail or handle provided at opposite ends with hooks $c$, engaging in the openings $b'$ of the ears, lips $d$, formed on the bail and bearing against the upper edges of the ears, and stops or projections formed on said ears and adapted to limit the swinging movement of the bail, substantially as set forth.

Witness our hand this 17th day of October, 1888.

GEORGE DAKIN.
HARRY L. DRULLARD.

Witnesses:
JNO. J. BONNER,
C. D. HOWE.